United States Patent [19]

Ikeda et al.

[11] Patent Number: 5,050,218
[45] Date of Patent: Sep. 17, 1991

[54] APPARATUS FOR RECOGNIZING ADDRESS APPEARING ON MAIL ARTICLE

[75] Inventors: Osamu Ikeda; Kazunari Egami, both of Tokyo, Japan

[73] Assignee: NEC Corporation, Tokyo, Japan

[21] Appl. No.: 657,612

[22] Filed: Feb. 19, 1991

Related U.S. Application Data

[63] Continuation of Ser. No. 89,458, Aug. 26, 1987, abandoned.

[30] Foreign Application Priority Data

Aug. 26, 1986 [JP] Japan .................................. 61-201015
Aug. 26, 1986 [JP] Japan .................................. 61-201016

[51] Int. Cl.$^5$ .............................................. G06K 9/00
[52] U.S. Cl. .................................................. 382/1; 382/9; 382/40; 382/48
[58] Field of Search ............... 382/1, 58, 9, 63, 40, 382/19, 48; 209/583, 584; 364/900, 419, 400

[56] References Cited

U.S. PATENT DOCUMENTS

| 4,034,341 | 7/1977  | Isono et al.      | 382/1 |
| 4,051,457 | 9/1977  | Inose et al.      | 382/1 |
| 4,481,665 | 11/1984 | Ota               | 382/9 |
| 4,516,265 | 5/1985  | Kizu et al.       | 382/1 |
| 4,524,453 | 6/1985  | Egami et al.      | 382/1 |
| 4,562,594 | 11/1985 | Bednar et al.     | 382/9 |
| 4,654,873 | 3/1987  | Fujisawa et al.   | 382/9 |
| 4,731,857 | 3/1988  | Tappert           | 382/9 |
| 4,811,412 | 3/1989  | Katsurada         | 382/9 |

FOREIGN PATENT DOCUMENTS 137976   8/1982   Japan ...................................... 382/1

*Primary Examiner*—Michael Razavi
*Attorney, Agent, or Firm*—Sughrue, Mion, Zinn, Macpeak & Seas

[57] ABSTRACT

An address recognition apparatus and method is disclosed in which keyword and/or postal code detection is initially performed in order to limit the number of address dictionaries needed for final address detection. According to one embodiment, detected keywords are associated with property codes which may be designated for city names, street names, etc. The address dictionary memory is or can be separated into a plurality of segments, particular ones of which are selected on the basis of the property code of a given keyword.

12 Claims, 8 Drawing Sheets

FIG. 1(a)
PRIOR ART

{ CENTRAL BANK    BLDG    15TH    FLOOR
( BUILDING NAME )    (KEYWORD)    (KEYWORD)

BLOCK    123   AB    ANG   MO   K10    AVENUE
(KEYWORD)    (LOT NUMBER)    ( AVENUE NAME )    (KEYWORD)

SINGAPORE    1234
(KEYWORD)    (POSTAL CODE) }

FIG. 1(b)
PRIOR ART

WORD (14) [CENTRAL]   WORD (13) [BANK]   WORD (12) [BLDG]   WORD (11) [15TH]   WORD (10) [FLOOR]

WORD (9) [BLOCK]   WORD (8) [123]   WORD (7) [AB]   WORD (6) [ANG]   WORD (5) [MO]   WORD (4) [K10]   WORD (3) [AVENUE]

WORD (2) [SINGAPORE]   WORD (1) [1234]

FIG. 1(c)
PRIOR ART

[(14)] [(13)] [(12)] [(11)] [(10)] — THIRD LINE

[(9)] [(8)] [(7)] [(6)] [(5)] [(4)] [(3)] — SECOND LINE

[(2)] [(1)] — FIRST LINE

APPARATUS FOR RECOGNIZING ADDRESS APPEARING ON MAIL ARTICLE

This is a continuation of application Ser. No. 07/089,458 filed Aug. 26, 1987 and now abandoned.

BACKGROUND OF THE INVENTION

The present invention relates to an apparatus for recognizing an address appearing on a mail article.

In a conventional address recognition apparatus, combinations of words contained in an address description are picked up and the combinations of words are successively compared with those in an address dictionary. When maximum coincidence is detected, the address is recognized as an address corresponding to one in the address dictionary. However, an address description generally contains a multiplicity of words for address information, such as country, state, prefecture, city, town, village, avenue, street, lot numbers, street numbers, company, building, etc. Therefore, in the conventional address recognition apparatus, the various words of the address information are extracted word-by-word. After this, many combinations of words which constitute an address are sequentially picked up and compared with address dictionaries stored in a dictionary memory, one by one, in order to recognize the address description. Therefore, a disadvantageously long time is required to execute address recognition processing, which causes the conventional apparatus of this type to have low processing capability.

The operation of such a conventional apparatus will be described below by way of an example involving the address shown in FIG. 1(a), which contains three lines having a string of words. In FIG. 1(a), the city name and postal code are shown in the bottom line, the street name of avenue and numerals in the middle line and the building name and floor destination in the top line. FIGS. 1(b) and 1(c) show extracted words corresponding to the address description shown in FIG. 1(a) and numbers indicating the extracted words. In address recognition processing, address constituent items such as city name, avenue and building name are recognized from the word train in each line shown in FIG. 1(c).

In the detection process, address constituent items are detected from bottom to top in the address description shown in FIG. 1(a), such that recognition is effected from larger address factor to smaller address factor. That is, the city name avenue, lot number and building name are sequentially detected.

Accordingly, the possible combinations of words, which are to be compared with address dictionaries, are as follows: three combinations in the first line, fifteen combinations in the second line, and twenty-eight combinations in the third line, as shown in FIG. 2. The following is a rough estimate of the number of comparing operations conventionally required to compare this address with address dictionaries which contain 500 registered country/city names, 2000 registered avenue names, and 500 registered building names.

In this example, the address dictionaries are classified (broken down) on the basis of the number of characters included in a given dictionary word (word length) as follows:

Classification of country/city names;
  18 classes, from 3 characters to 20 characters
Classification of avenue names;
  25 classes, from 6 characters to 30 characters
Classification of building names;
  25 classes, from 6 characters to 30 characters For the matching method, a dynamic programming (DP) matching method is adopted in which an input word including n characters (a word length of n) is compared with dictionary segments of three different classes, i.e., dictionary words of word lengths $n-1$, $n$ and $n+1$, respectively. Accordingly, the number of comparing operations may be estimated, on average, as follows:

(1) First line - (detection of names of country/city)

$$3 \text{ (combinations)} \times \frac{500 \text{ (items)}}{18 \text{ (classes)}} \times 3 \text{ (word lengths)} = 250 \text{ (times)}$$

(2) Second line - (detection of avenue and building names)

$$28 \times \frac{2000 + 500}{25} \times 3 = 8,400$$

(3) Third line - (detection of building name)

$$15 \times \frac{500}{25} \times 3 = 900$$

Thus, in order to recognize the address shown in FIG. 1(a), the comparing operation must be executed a total of 9,550 times. Accordingly, assuming that the conventional apparatus needs 20 μs to execute one comparing operation, about 190 ms is needed to execute the whole operation for recognizing one address, which corresponds to a processing rate of 19,000 letters per hour. In order to achieve a desired processing rate of 30,000 letters per hour, two of the conventional systems are disadvantageously necessary.

There is another type of a conventional apparatus for recognizing an address description appearing on a mail article, in which, in order to reduce the number of dictionary words to be compared, the number of characters contained in a word (word length) and one or two characters at the beginning of the word are noted and word dictionaries are grouped and linked in a memory on the basis of the characteristics of these factors. Thus, when a character string of an input word is compared with word dictionaries the word dictionaries to be compared are restricted in accordance with the word length of the input word and the first character(s) of the input word, and the dictionary words to be compared are sequentially read out in a predetermined linked manner. This technique is described in U.S. patent application Ser. No. 799,831 "Word Recognition Apparatus" filed on Nov. 20, 1985.

This address recognition apparatus suffers, however, from the following problem. Since the word dictionaries are grouped using the word length and the first character(s), the numbers number of registered addresses is more or less the same irrespective of the regional characteristic of the mail quantity distribution, which means that the time required for the address recognizing operation cannot be sufficiently reduced even when the regional characteristic of the mail quantity distribution is relatively marked.

SUMMARY OF THE INVENTION

Accordingly, it is an object of the present invention to provide an address recognition apparatus which can reduce the address recognition processing time to a large extent.

According to a first feature of the present invention, there is provided an address recognition apparatus in which a predetermined keyword which characterizes an address description is detected and word dictionaries which are used for address recognition are restricted on the basis of the detected keyword. More specifically, according to the first feature of the present invention, there is provided an address recognition apparatus which comprises a word extracting section for extracting words from an address description on a mail article, a keyword detecting section for detecting a keyword by comparing the extracted words with predetermined keyword dictionaries, a word combining extracted section for combining words in response to the keyword detection result to produce a word combination, and a comparing section for comparing the word combination with address dictionaries.

According to a second feature of the present invention, there is provided an apparatus for recognizing an address including a postal code appearing on a mail article, which comprises a postal code index table storage for storing linkage information concerning word dictionaries linked with postal codes, a word dictionary reading section for reading out a word dictionary in response to the linkage information stored in the postal code index table storage associated with an input read-out postal code, and a comparing section for comparing an input read-out word with the read-out word dictionary.

BRIEF DESCRIPTION OF THE DRAWINGS

FIGS. 1(a), 1(b) and 1(c) show one example of an address description, with the arrangement of the extracted words shown in the example of FIG. 1(a) and numbers attached to the extracted words in FIG. 1(b), respectively;

PREFERRED EMBODIMENTS OF THE INVENTION

In a first embodiment according to the first feature of the present invention, predetermined keywords which characterize a word alignment in the address description are registered in a keyword dictionary memory in advance, and input words extracted by a word extracting section are then compared with the registered keywords for key word detecting detection. After the keyword detection, combinations of input words which are to be compared with address dictionaries are determined on the basis of the keyword detection by a word restricting section, and the restricted word combinations are compared with the address dictionaries by an address judging section. Namely, according to the present invention, since the dictionaries to be compared are restricted by use of the keyword, the time required for the address recognition operation can be reduced.

Figure 3:
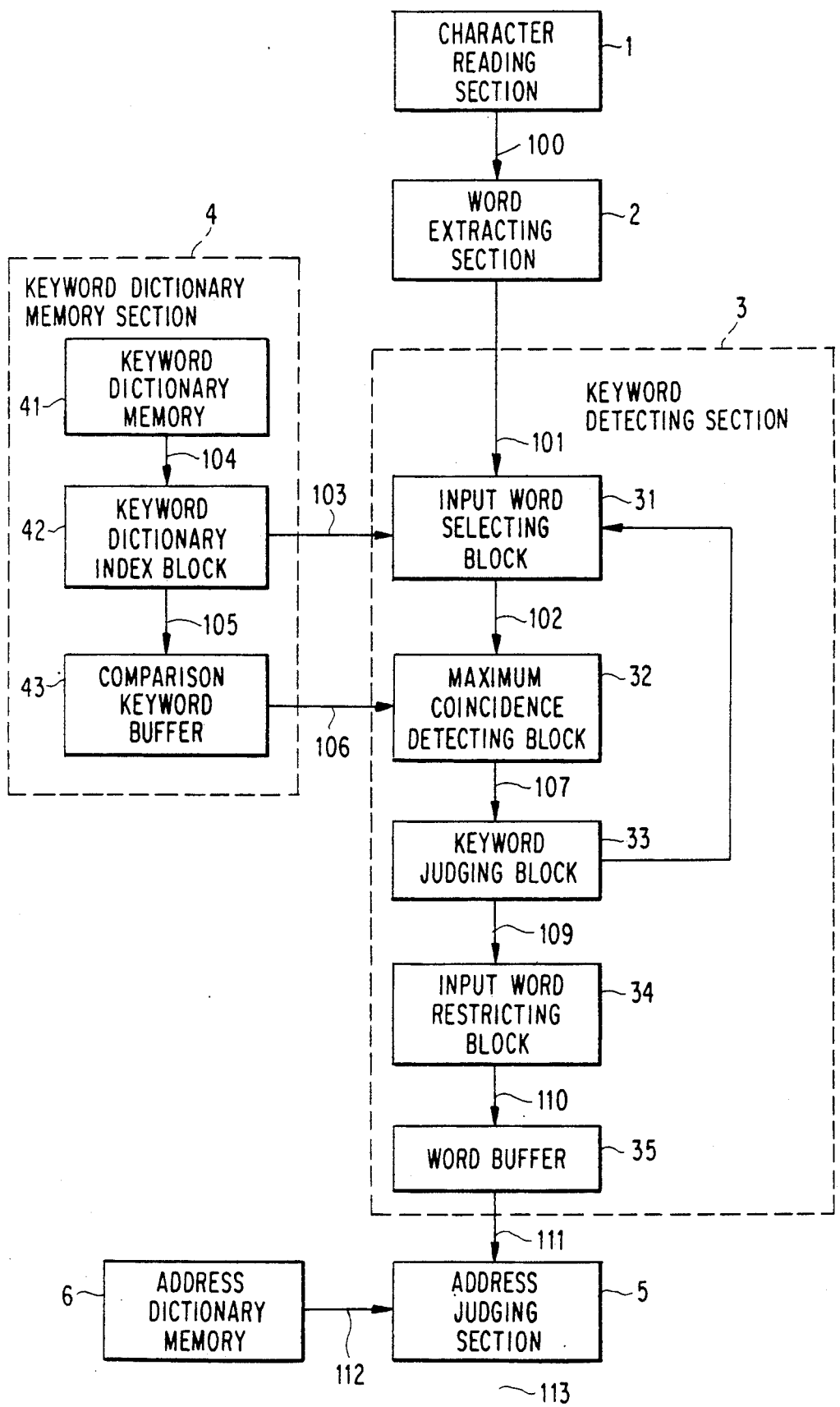
FIG. 3 is a block diagram of a first embodiment according to the present invention.

FIG. 3 is a block diagram showing a first embodiment according to the present invention. It is assumed, in this embodiment, that an address description including the names of the city and avenue, lot number and a building name shown in FIG. 1(a) is read out and processed for address recognition. In the process, address constituent elements (words) are detected and separated from each other beginning with the bottom line and proceeding to the upper lines in the address description of FIG. 1(a), such that the recognition process advances from larger address indicators to smaller address indicators, that is, the names of the city, avenue, lot number and building name are detected in that order.

This first embodiment comprises a character reading section 1, a word extracting section 2, a keyword detecting section 3, a keyword dictionary memory section 4, an address judging section 5, and an address dictionary memory 6. The keyword detection section 3 comprises an input word selecting block 31 which receives the words output from the word extracting section 2, a maximum coincidence detecting block 32 which checks input words against a keyword dictionary, and a keyword judging block 33 which judges a word to be a keyword, an input word restricting block 34 which combines words to be compared with address dictionaries for the address judging section 5 on the basis of the detected keyword, and a word buffer 35 which stores the combined words. The keyword dictionary memory section 4 comprises a keyword dictionary memory 41, a keyword dictionary index block 42, and a keyword buffer 43.

Read-out character data 100 from the character reading section 1 are supplied to the word extracting section 2, and word information data 101 outputted from the word extracting section 2 are supplied to the input word selecting block 31. Selected word data 102, which constitute a first output of the input word selecting block 31 are supplied to the maximum coincidence detecting block 32. Word length data 103, which constitute a second output of the input word selecting block 31, are sent to the dictionary index block 42. Keyword dictionary data 104 associated with the input word length data 103 are supplied to the dictionary index block 42 from the keyword dictionary memory 41. Keyword dictionary data 105 delivered from the dictionary index block 42 are supplied to the comparison keyword buffer 43. Keyword dictionary data 106 from the comparison keyword buffer 43 are supplied to the maximum coincidence detecting block 32. The comparison result 107 from the maximum coincidence detecting block 32 is supplied to the keyword judging block 33. A keyword detection end signal 108 from the keyword judging block 33 is supplied to the input word selecting block 31, and a keyword detection result 109 from the keyword judging block 33 is supplied to the input word restricting block 34. Combined word data 110 delivered from the input word restricting block 34 are supplied to the word buffer 35, and the combined word data 111 from the word buffer 35 are supplied to the address judging section 5. Address dictionary data 112 delivered from the address dictionary memory 6 are supplied to the address judging section 5.

The operation of this embodiment will next be described with reference to the drawings. The character reading section 1 outputs the read-out character data 100 corresponding to the characters shown in FIG. 1(a) for each of the lines. In this case, the characters are read out in series from either the left or right end of each line. In the word extracting section 2, spaces or the like between adjacent words are detected, and the character strings are thus separated into words as shown in FIG. 1(b). Then, word numbers (1), (2), (3) ... (14) are given to the extracted words successively from the word at the right end of the lowermost line. The word information data 101 corresponding to these words are supplied to the input word selecting block 31.

Figure 4:
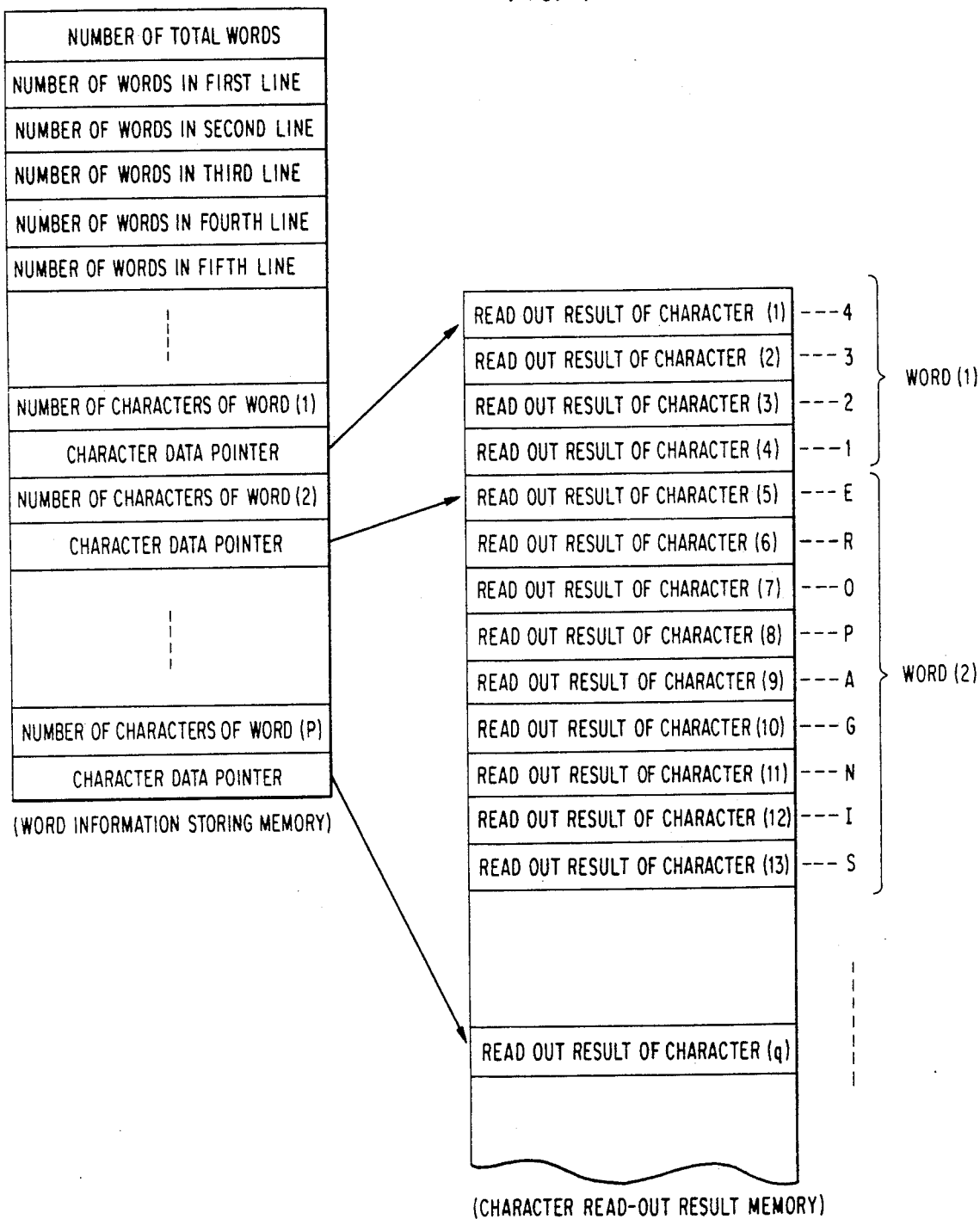
FIG. 4 shows one example of the data structure of word information data delivered from a word extracting section shown in FIG. 3.

FIG. 4 shows the data structure of the word information data 101 from the word extracting section 2. The word information data 101 includes the total number of detected words, the number of words contained in each line, the number of characters contained in each word (word length), and a pointer indicating a memory address at which a read-out result corresponding to each word is stored.

Figure 5A:
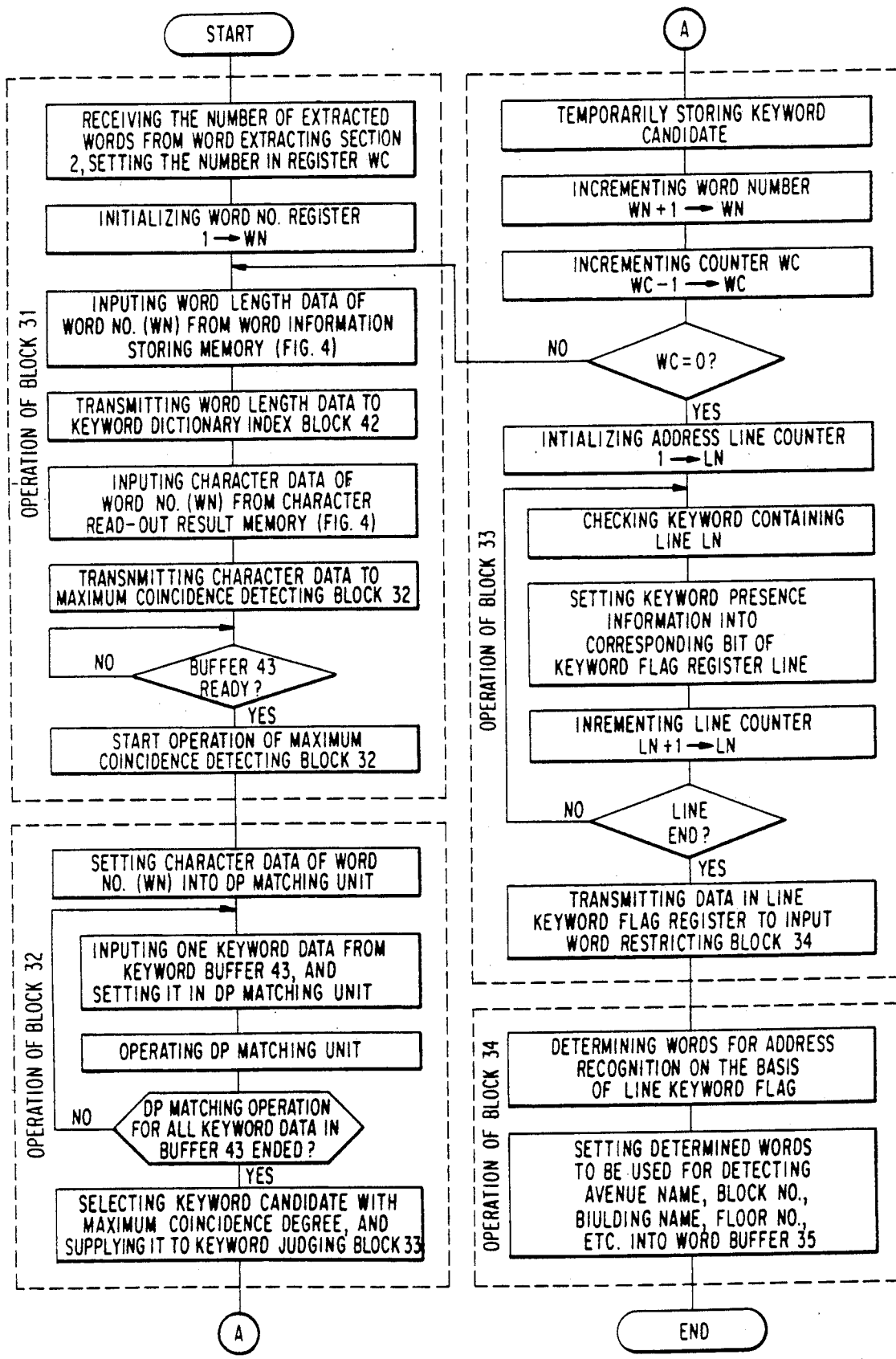
FIGS. 5(a) and 5(b) are flowcharts showing the operations of essential parts of the embodiment shown in FIG. 3.

The operations of the keyword detecting section 3 are described in a flowchart shown in FIG. 5(a). The input word selecting block 31 receives the data on the total number of words from the input word information data 101 shown in FIG. 4 and sets the received data in a counter WC which controls a keyword detection processing loop pertinent to the keyword detection end signal 108 (FIG. 3). Then, a register WN which stores the serial number of each of the words to be subjected to keyword detection is initially set to 1, and keyword detection is started.

Figure 5B:
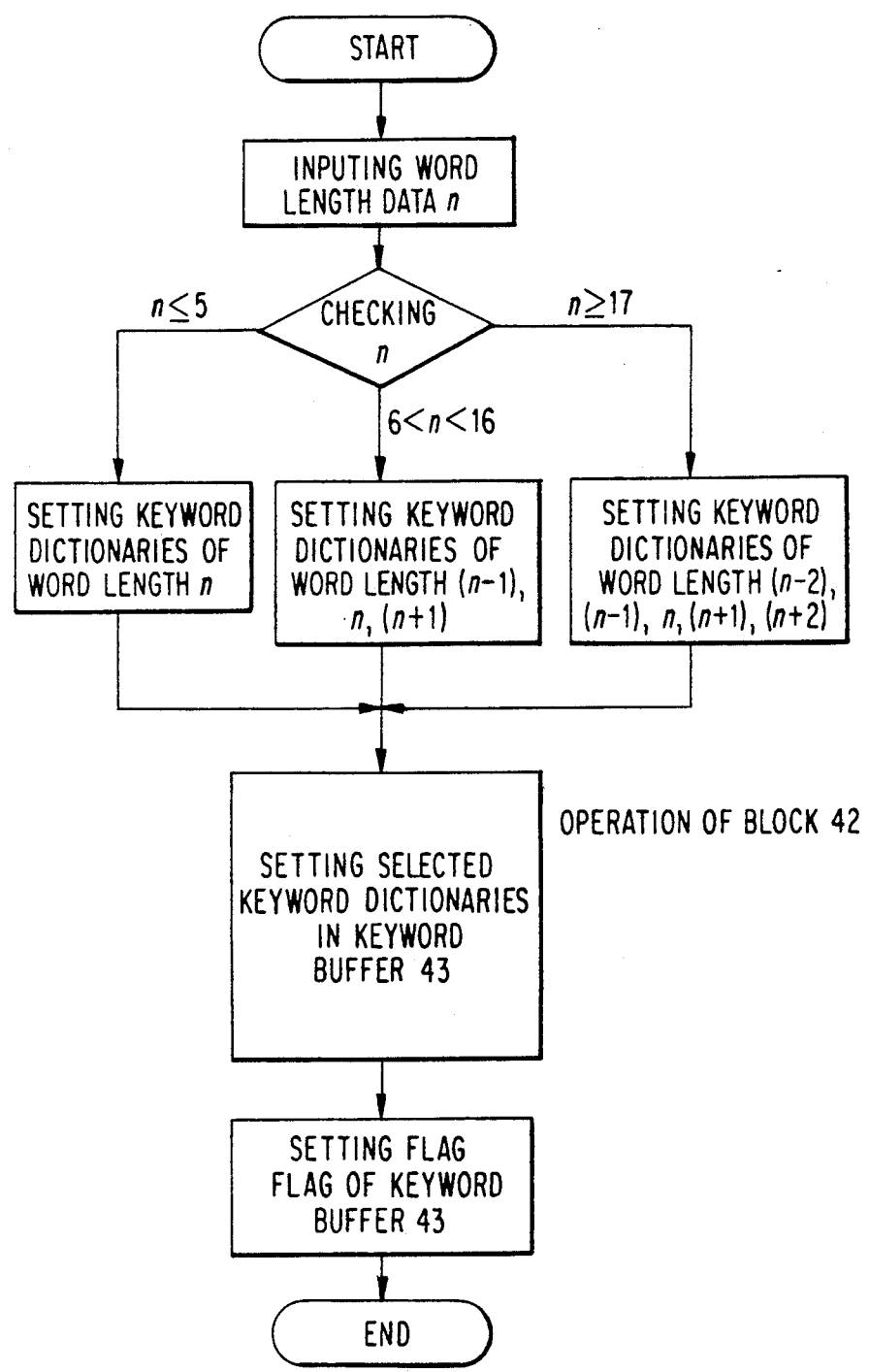

First, word length data concerning the word having the number set in the register WN, that is, the number of characters contained in the word, is fetched from the word information data 101 shown in FIG. 4 and then transferred to the keyword dictionary index block 42 to execute reading of a keyword dictionary. Next, the character read-out result concerning the same word is transferred to the maximum coincidence detecting block 32. Then, the process awaits the completion of reading of the keyword dictionary. The completion of reading of the keyword dictionary is detected from the fact that the keyword buffer 43 has become "Ready". The keyword dictionary index block 42 operates as shown in FIG. 5(b). More specifically, when word length data n are input, the keyword dictionary index block 42 checks the word length and determines the keyword dictionary groups to be compared. In this embodiment, when the word length n is 5 or less, a keyword dictionary group having the same word length as that of the input word is read out and set in the comparison keyword buffer 43. When the word length n is from 6 to 16, three keyword dictionary groups having word lengths (n−1), n and (n+1) are read out. Further, when the word length n is 17 or more, five keyword dictionary groups having word lengths (n−2), (n−1), n, (n+1) and (n+2) are read out. When all the required dictionary groups have been read out and set in the comparison keyword dictionary buffer 43, the "Ready"

flag is set, and the maximum coincidence detecting block 32 is started.

In the maximum coincidence detecting block 32, the word data 102 received from the input word selecting block 31 is compared with keyword dictionary data 106 from the comparison keyword buffer 43. The input word selecting block 31 receives the words shown in FIG. 1(b), successively from the word (1), and sends these words to the maximum coincidence detecting block 32. The maximum coincidence detecting block 32 compares the input word with the keyword dictionary by a DP Matching Method, for example, and outputs the comparison result to the keyword judging block 33.

In the keyword dictionary memory 41, the keywords are registered with their property codes, as exemplarily shown in Table 1.

TABLE 1

| Word length | Key words | Property codes |
|---|---|---|
| 2 | RD | $(8001)_{16}$ |
| 2 | DR | $(8001)_{16}$ |
| 2 | ST | $(8001)_{16}$ |
| 2 | CT | $(8001)_{16}$ |
| 3 | BLK | $(2002)_{16}$ |
| 4 | BLDG | $(4001)_{16}$ |
| 4 | ROAD | $(8001)_{16}$ |
| 5 | DRIVE | $(8001)_{16}$ |
| 5 | COURT | $(8001)_{16}$ |
| 5 | FLOOR | $(2004)_{16}$ |
| 5 | BLOCK | $(2002)_{16}$ |
| 6 | AVENNE | $(8001)_{16}$ |
| 6 | STREET | $(8001)_{16}$ |
| 8 | BUILDING | $(4001)_{16}$ |
| 9 | SINGAPORE | $(2002)_{16}$ |

Figure 6:
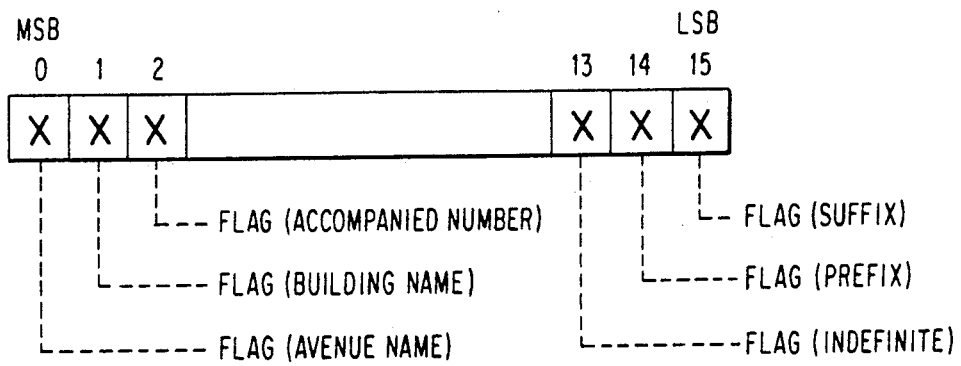
FIG. 6 shows one example of the data structure of a keyword dictionary in accordance with the first embodiment.

The keyword dictionary shown in Table 1 consists of word length data as an index, keywords, the property codes of the keywords. The property codes represent the properties of the keywords and each property code consists of, for example, 16 bits, as shown in FIG. 6. More specifically, a keyword flag employed for an avenue (or street, road, etc.) name is provided at the MSB bit ("0" bit), a keyword flag employed for a building name at the "1" bit, and a keyword flag accompanied by a number at the "2" bit, thereby effecting keyword discrimination. Further, a prefix flag employed for a keyword which is placed at the top of an address description is provided at the "14" bit, a suffix flag employed for a keyword which is provided at the end of an address description is provided at the "15" bit (LSB), and a flag representing information as to whether or not the position of a particular keyword is indefinite at the "13" bit. In this case, bits "3" to "12" are available as user bits. For example, the keyword "AVENUE" has a property code $(8001)_{16}$ which represents the fact that this keyword is employed in the name of an avenue and is placed at the end of the avenue name, while the keyword "BLK" or "BLOCK" has a property code $(2002)_{16}$ which represents the fact that this keyword is accompanied by a number which is placed thereafter. In this case, each element of the property code $(XXXX)_{16}$ represents 4 bits hexadecimal and, therefore, $(8001)_{16}$ corresponds to "1000000000000001".

Figure 7:
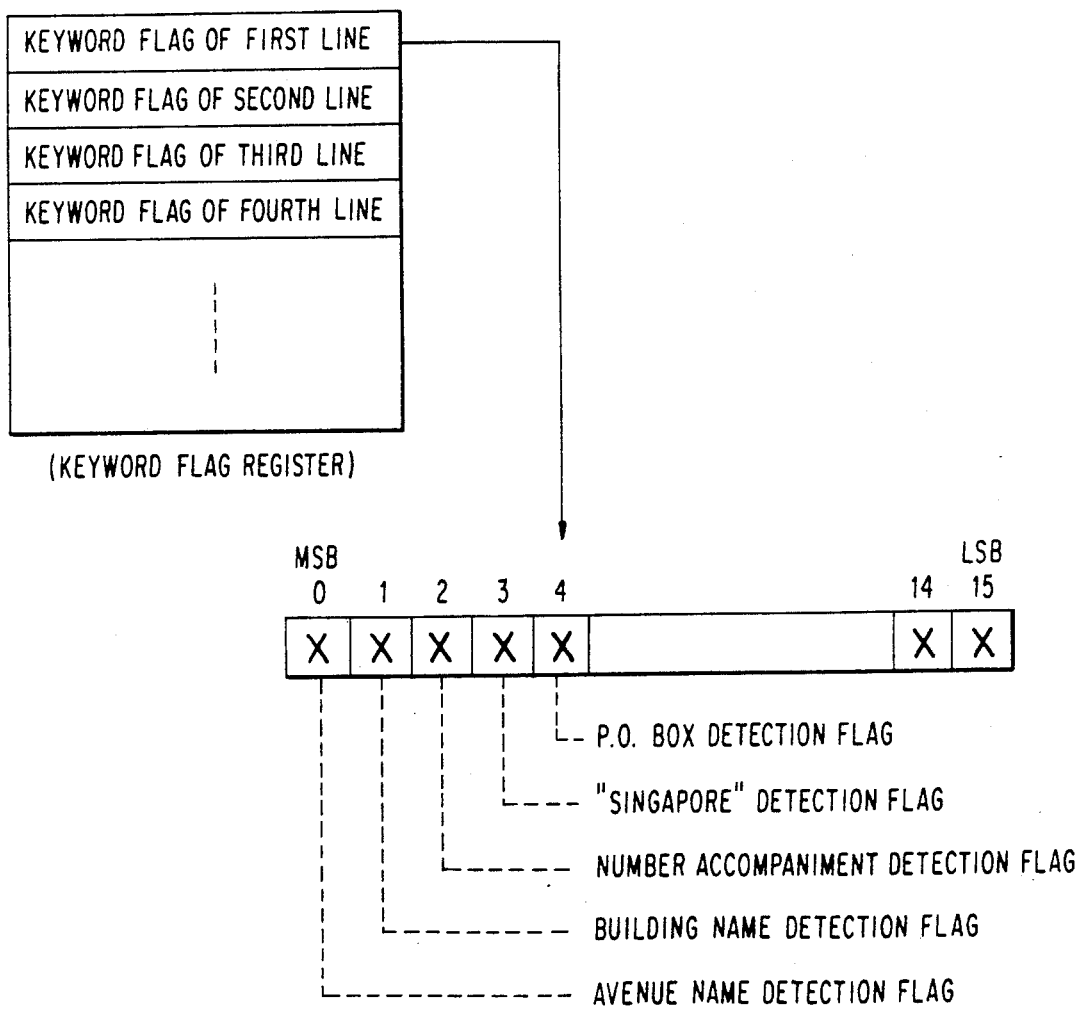
FIG. 7 shows one example of the data structure of output data delivered from a keyword judging section in the first embodiment.

In order to achieve a high-speed address recognition processing, it is effective practice to register (and indicates a bit) a keyword which frequently appears in address descriptions, for example, "SINGAPORE" which appears on most mail articles handled in Singapore (See FIG. 7).

The keyword judging block 33 outputs a comparison request to the input word selecting block 31 via the signal 108 for each of the words, from the word (1) in the first line to the word (14) in the third line, to continue the comparison operation.

As shown in FIG. 5(a), the keyword judging block 33 temporarily stores keyword candidates with coincidence degrees higher than a predetermined threshold value, and repeats the aforementioned keyword detection process for all lines. After this, the block 33 checks whether or not a keyword is present in each line by comparing the coincidence degrees. Accordingly, the judgment results 109 are set into line keyword flag registers as shown in FIG. 7.

In the comparison between the word (2) in the first line shown in FIG. 1(b) and the keyword dictionaries, the word (2) coincides with "SINGAPORE" in the keyword dictionary shown in Table 1, and a code $(3000)_{16}$ is set into the keyword flag register for the first line as the keyword judgment result 109. This data is supplied to the input word restricting block 34. In the second line, words (3) and (9) coincide with the keywords "AVENUE" and "BLOCK", respectively, and a code $(A000)_{16}$ is set in the keyword flag register for the second line and supplied to the block 34. In the third line, words (10) and (12) coincide with the keywords "FLOOR" and "BLDG", respectively, and a code $(6000)_{16}$ is set in the keyword flag register for the third line and supplied to the block 34.

The input word restricting block 34 determines the combination of words used in effecting address recognition by referring to the keyword flag registers (FIG. 7) for each of the lines and the keyword property codes, and sets the determined word combination in the word buffer 35.

Figure 8:
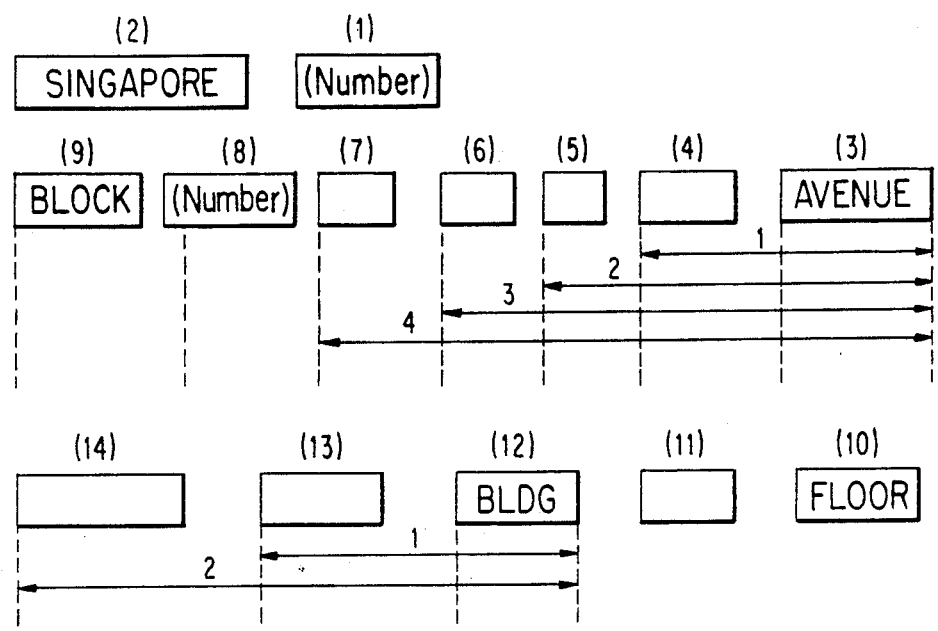
FIGS. 8(a), 8(b) and 8(c) are diagrams for explaining the keyword detecting operation in accordance with the first embodiment.

FIGS. 8(a) to 8(c) show the manner by which the word combination is determined. FIG. 8(a) shows the result of the detection of the keyword in the first line. In the input word restricting block 34, it is possible to detect that the word (2) is accompanied by a number from the property code $(2002)_{16}$ of the keyword "SINGAPORE". As a result, since a city name has already been detected in the first line, it is unnecessary to handle the first line in the address judging section 5.

Figure 2:
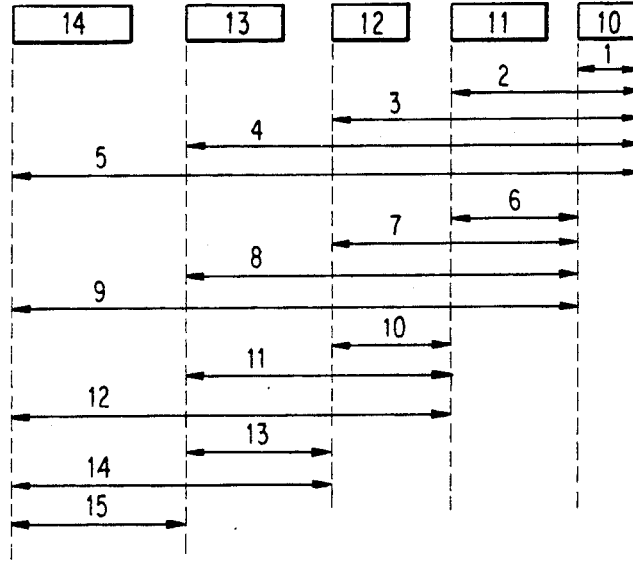
FIG. 2 shows combinations of the words shown in FIG. 1(a) which are to be applied to comparison processing in the recognition process according to a conventional apparatus.
Figure 2:
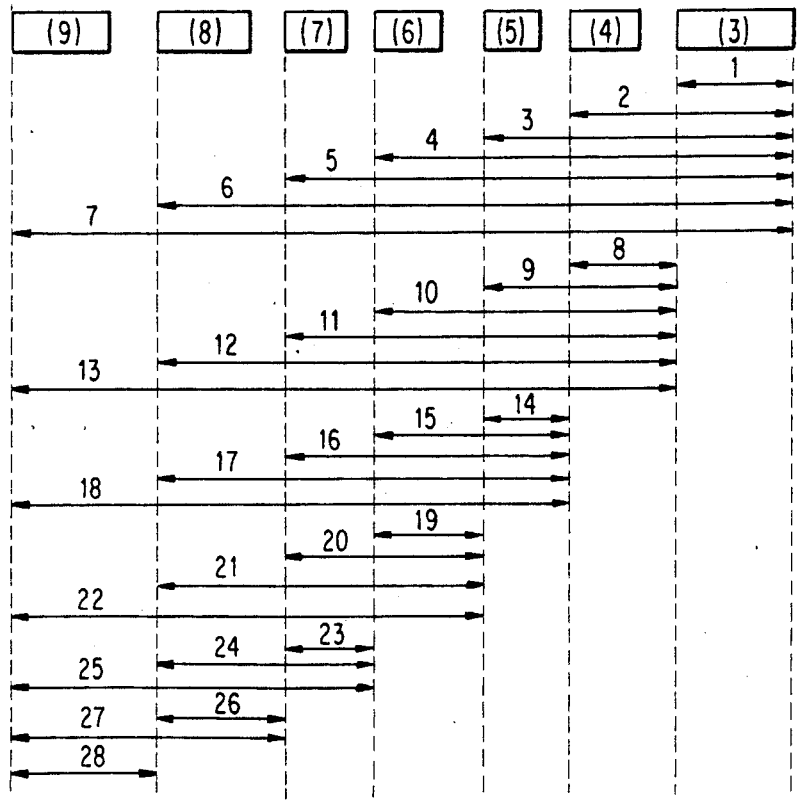

In the second line, words (3) and (9) are detected as keywords as shown in FIG. 8(b). With respect to the word (3) (keyword "AVENUE"), it is possible to detect that this keyword is placed at the end of a name of avenue from the property code $(8001)_{16}$. With respect to the word (9) (keyword "BLOCK"), it is possible to detect that this keyword is accompanied by a number which is placed thereafter from the property code $(2002)_{16}$. As a result, it is understood that in the second line the name of the street or avenue can be determined from a combination of words including the word (3) at the end. Accordingly, it sufficient to compare only four combinations of words shown in steps 1 to 4 of FIG. 8(b) with avenue name dictionaries in the address dictionary memory 6, which means that the number of word combinations is reduced to one seventh of the 28 combinations which would have to be examined in the case where no keyword was detected (see FIG. 2).

In the third line, the words (10) and (12) are detected as keywords as shown in FIG. 8(c). With respect to the word (10) (keyword "FLOOR"), it is possible to detect that this keyword is accompanied by a number which is placed either before or after it from the property code $(2004)_{16}$. With respect to the word (12) (keyword "BLDG"), from the property code $(4001)_{16}$, it is possible to detect that this keyword is employed in the name of a building and is placed at the end of it. As a result, it is understood that in the third line it suffices to judge the name of building from the combination of words which includes the word (12) at its end. Accordingly, it is sufficient to compare only the two combinations of words shown in steps 1, and 2 of FIG. 8(c) with building name dictionaries in the address dictionary memory section 6, which means that the number of word combinations is reduced to 1/7.5 of 15 combinations of words which would have been examined were no keyword detected (see FIG. 2).

The input word restricting block 34 inputs restricted combinations of input words to the word buffer 35. The address judging section 5 compares input words 111 (the restricted combinations) with the address dictionaries stored in the address dictionary memory 6 and outputs address judgment result 113.

According to this embodiment of the present invention, the number of comparing operations between the input words and the address dictionaries may be roughly estimated as follows:

(1) Detection of key words $$14 \text{ (combinations)} \times 15 \text{ (keywords)} = 210 \text{ (times)}$$

(2) Detection of names of country and city for the first line $$0 \text{ (times) (the city name has already been detected in the keyword detection process)}$$

(3) Detection of the avenue for the second line $$4 \text{ (combinations)} \times 2000 \text{ (items)} \div 25 \times 3 = 960 \text{ (times)}$$

(4) Detection of the building name for third line $$2 \text{ (combinations)} \times 500 \text{ (times)} \div 25 \times 3 = 120 \text{ (times)}$$

Accordingly, the total number of comparing operations is 1290. Thus, in the example the number of comparisons was reduced to 1/7.5 of the number of conventionally required operations, i.e., 9550, in which no keyword detection was carried out.

As has been described above, the first embodiment of the present invention enables the restriction of input words to be compared with address dictionaries by first detecting a keyword in each line of the address description. Therefore, it is possible to shorten the address processing time to a large extent.

A second embodiment according to the second feature of the present invention will next be described. The second embodiment is arranged so as to recognize an address by utilizing a postal code (Zip code) contained in the address description. According to this embodiment, dictionaries to be compared with input words are classified into groups in accordance with postal codes, and the groups are further classified into groups in accordance with the number of characters constituting the words (word length) and one or two characters at the beginning of each word. In recognition processing, the dictionaries to be compared are restricted on the basis of linkages of items such as the postal code, the number of characters and the top character(s), and a comparing operation with the restricted dictionaries is thus executed.

Figure 9:
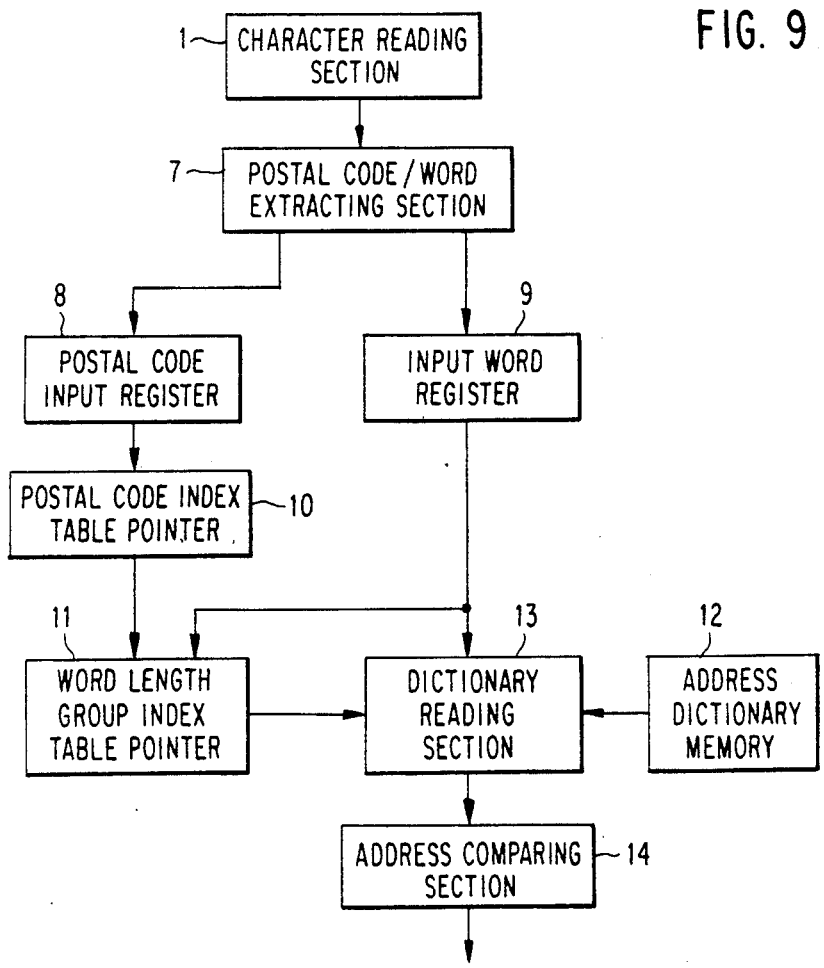
FIG. 9 shows a block diagram of a second embodiment according to the present invention.

FIG. 9 shows the second embodiment of the present invention. A postal code/word extracting section 7 receives character read-out results from a character reading section 1 and extracts the postal code and words. A postal code input register 8 sets the postal code delivered from the code/word extracting block 7 and an input word register 9 sets the words delivered from the extracting section 7. A postal code index table pointer 10 stores chain (linkage) information concerning words linked to postal codes and outputs chain information constituting certain words linked to the input postal code to a word length group index table pointer 11. The word length group index table pointer 11 receives the chain information on the basis of the postal code and the words from the register 9, and outputs second chain information that further restricts the applicable dictionaries on the basis of the number of word characters and the first character(s) in addition to the postal code. A dictionary read section 13 reads out the restricted address dictionaries to be compared from an address dictionary memory 12 on the basis of the second chain information, and an address comparing section 14 compares the input word delivered from the input word register 7 with the read-out dictionaries.

As has been described above, the second embodiment of the present invention enables sufficient restriction of the dictionaries which are to be compared with the input words and thereby reduces the recognition process time to a large extent by classifying address dictionaries predetermined groups on the basis of postal codes in addition to word length and first character(s), and by linking the dictionaries.

Furthermore, it is possible to apply the second feature of the present invention to the first feature of the present invention. Namely, when address dictionaries are read out from the address dictionary memory 6 (FIG. 3), the number of read-out address dictionaries can be also reduced by utilizing information on the postal code, the word length, and or one or more characters at the beginning of a word. This further application enables a dramatic reduction in the recognition processing time.

What is claimed is:

1. An apparatus for recognizing an address appearing on an article, comprising:
   character reading means for reading an address description appearing on an article to produce character data;
   word extracting means responsive to said character data for extracting words from said character data, to produce a string of words;
   keyword detecting means for detecting a keyword contained in said string of words by comparing each word of said string of words outputted from said word extracting means with a plurality of predetermined keyword dictionaries, to produce keyword information, when said string of words contains at least one keyword;
   word combining means, responsive to said keyword information, for combining remaining non-keyword words contained in said string to produce a plurality of word combinations which are to be subjected to address recognition;
   an address dictionary memory for storing a plurality of address dictionaries; and
   address comparing means for comparing selected ones of said address dictionaries stored in said address dictionary memory with each word combination of said plurality of word combinations produced by said word combining means.

2. An apparatus according to claim 1, wherein said address description includes a plurality of lines each containing at least one word; said word extracting means extracting a string of words for each line, and wherein said keyword information includes a property code attached to a keyword detected by said keyword detecting means, and said word combining means being responsive to said property code in combining the words of each of said lines to produce said plurality of word combinations.

3. An apparatus for recognizing an address appearing on an article, comprising:
   character reading means for reading an address description appearing on an article to produce character data;
   word extracting means responsive to said character data for extracting words from said character data, to produce a string of words;
   keyword detecting means for detecting a keyword contained in said string of words by comparing said string of words outputted from said word extracting means with a plurality of predetermined keyword dictionaries, to produce keyword information when said string of words contains at least one keyword;
   word combining means responsive to said keyword information for combining words contained in said string to produce a word combination which is to be subjected to address recognition;
   an address dictionary memory for storing a plurality of address dictionaries;
   address comparing means for comparing selected ones of said address dictionaries stored in said address dictionary memory with said word combination produced by said word combining means;
   wherein said address description includes a plurality of lines each containing at least one word; said word extracting means extracting a string of words for each line, and wherein said keyword information includes a property code attached to a keyword detected by said keyword detecting means, and said word combining means being responsive to said property code in combining the words of each of said lines; and
   wherein said property code designates that the associated keyword is associated with one of a P.O. Box number, a country name, a city name, a street or avenue name, a building name and a predetermined number sequence.

4. An address recognizing apparatus, comprising:
   character read means for reading a string of characters contained in an address description;
   word extracting means for extracting words from said string of characters by editing said string of characters to form words;
   address dictionary memory means for storing word dictionaries, each containing a string of characters; and
   means for comparing the extracted words delivered from said word extracting means with said word dictionaries read out from said address dictionary memory means to thereby recognize an address, wherein said apparatus further comprises keyword dictionary memory means for storing keyword dictionaries, keyword detecting means for detecting at least one keyword contained in said address description by comparing said words contained in said address description with said keyword dictionaries, and means for determining appropriate dictionary portions of said word dictionaries to be compared with non-keyword ones of said extracted words on the basis of the keyword detection result obtained by said keyword detecting means.

5. An address recognizing apparatus for recognizing an address description on a mail article, said address description including a string of characters constituting at least one word and a postal code, comprising:

means for reading said address description to deliver word data corresponding to said words and postal code data corresponding to said postal code;

dictionary storage means for storing word dictionaries;

means for storing linkage information indicating predetermined linkages between said word dictionaries stored in said dictionary storage means and postal codes;

means for reading out predetermined at least one word dictionary from said dictionary storage means selected on the basis of said linkage information associated with said postal code; and means for comparing said word data with said at least one word dictionary.

6. An address recognizing apparatus for recognizing an address description on a mail article, said address description including a string of characters constituting at least one word and postal code, comprising:

means for reading said address description to produce word data corresponding to said words and code data corresponding to said postal code;

means for storing a plurality of address dictionaries and linkage information, said plurality of address dictionaries being classified into groups on the basis of postal codes and the number of characters in the words constituting said address dictionary, respectively, and said linkage information indicating connections between said groups and appropriate ones of said plurality of address dictionaries for comparison being determined on the basis of the postal code and the number of characters constituting said words;

means for reading out said appropriate ones of said address dictionaries from said storing means in response to said linkage information designated by the postal code and the number of characters constituting the words contained in said address description to deliver a read-out address dictionary; and means for comparing said word data with said read-out address dictionary to recognize said address description.

7. A method of recognizing an address description comprising:

reading character data of an address description to produce a character string;

extracting words from said character string, to produce a word string; comparing said words with at least one keyword dictionary, to detect at least one keyword in said word string;

combining non-keywords words in the vicinity of the keyword to produce non-keyword word combinations which are to be subjected to address recognition, said combining being conducted in dependence upon at least the type of keyword detected; and comparing said word combination of said non-keyword word combinations with predetermined address dictionaries which are selected from a dictionary memory on a basis of at least said type of said keyword.

8. A method as claimed in claim 7, further comprising the step of determining the number of characters contained in each extracted word, and selecting said at least one keyword dictionary on the basis of said number of characters.

9. A method as claimed in claim 8, further including the step of selecting the number of keyword dictionaries to be used for keyword comparison on the basis of the length of the extracted word.

10. A method as claimed in claim 7, wherein said word combining step comprises the steps of extracting from a keyword dictionary memory a property code associated with each detected keyword, and limiting the number of adjacent words to be combined to form said non-keyword word combination on the basis of said property code.

11. A method as claimed in claim 10, wherein the address dictionaries used for examining each non-keyword word combination are selected on the basis of the content of the property code associated with the keyword of said non-keyword word combination.

12. A method as claimed in claim 7 further including the step of extracting a postal code from said word string, and restricting said address dictionaries on the basis of said postal code.

* * * * *

UNITED STATES PATENT AND TRADEMARK OFFICE
CERTIFICATE OF CORRECTION

PATENT NO. : 5,050,218
DATED : September 17, 1991
INVENTOR(S) : Ikeda et al

It is certified that error appears in the above-identified patent and that said Letters Patent is hereby corrected as shown below:

Col. 3, line 15, delete "extracted".

Col. 3, line 16, after "combining", (second occurrence) insert --extracted--.

Col. 6, line 29, delete "AVENNE", insert --AVENUE--.

Col. 7, line 57, delete "1 to 4", insert -- ① to ④ --

Col. 8, line 8, delete " 1, and 2" insert -- ① and ② --

Signed and Sealed this

Second Day of March, 1993

Attest:

STEPHEN G. KUNIN

Attesting Officer     Acting Commissioner of Patents and Trademarks